(12) United States Patent
Kim et al.

(10) Patent No.: US 8,072,750 B2
(45) Date of Patent: Dec. 6, 2011

(54) TOP ANGLED OFFSET MULTI-MEDIA AND USER INTERFACE

(75) Inventors: David Kim, Taipei County (TW); Glen Kim, Taipei County (TW); Alejandro Garfio, Taipei County (TW)

(73) Assignee: Acer Incorporated, Taipei County (TW)

( * ) Notice: Subject to any disclaimer, the term of this patent is extended or adjusted under 35 U.S.C. 154(b) by 225 days.

(21) Appl. No.: 12/649,363

(22) Filed: Dec. 30, 2009

(65) Prior Publication Data

US 2011/0157803 A1 Jun. 30, 2011

(51) Int. Cl.
*G06F 1/16* (2006.01)

(52) U.S. Cl. ............. 361/679.56; 312/263; 165/104.33; 174/377

(58) Field of Classification Search .............. 312/223.2, 312/236, 265.5, 263, 222; 361/679.06, 679.21, 361/679.02, 679.32, 679.34, 679.37, 679.57, 361/679.4, 679.36, 679.31; 165/47, 80.2, 165/104.33, 121, 185, 80.4, 96; 174/569, 174/535, 50, 377, 359, 559, 354; 235/400, 235/375

See application file for complete search history.

(56) References Cited

U.S. PATENT DOCUMENTS

| | | | |
|---|---|---|---|
| 6,297,952 B1 * | 10/2001 | Liu et al. ................... | 361/679.31 |
| 2006/0262508 A1 * | 11/2006 | Chen et al. .................... | 361/724 |
| 2011/0012483 A1 * | 1/2011 | Tang et al. ................. | 312/223.2 |
| 2011/0221315 A1 * | 9/2011 | Chen ......................... | 312/223.2 |

* cited by examiner

*Primary Examiner* — Hung Duong

(74) *Attorney, Agent, or Firm* — Thomas|Kayden

(57) ABSTRACT

A computer enclosure with a user interface having an improved user-accessibility. The user interface is located at the upper front corner of the computer enclosure box. In the preferred embodiment, the interface is located on a protrusion extending out of the upper front corner of the enclosure box. The user interface has a surface plane that is preferably angled between 20-70 degrees to the ground to which the enclosure sits on. In other preferred embodiments, the user interface has a surface plane that is preferably angled between 40-60 degrees to the ground to which the enclosure sits on.

16 Claims, 8 Drawing Sheets

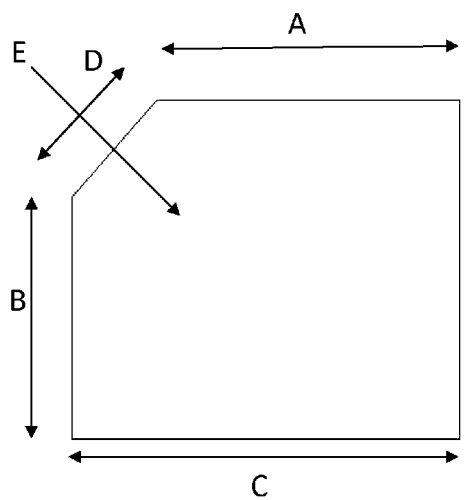
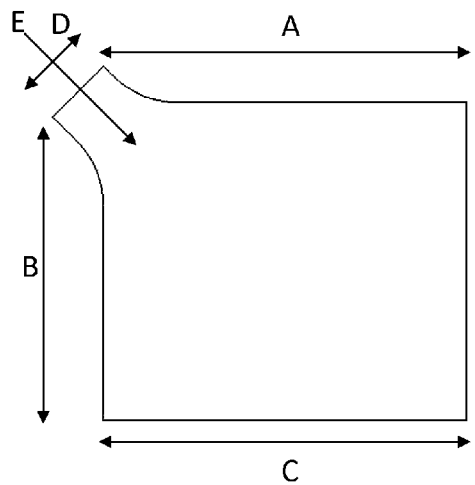
FIG. 5A              FIG. 5B
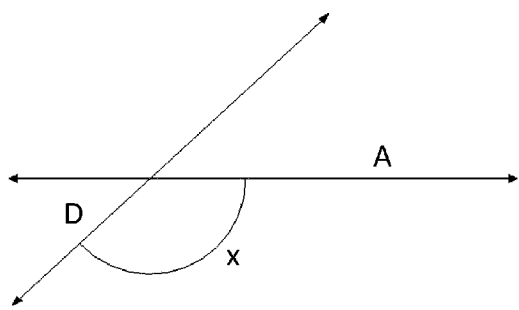
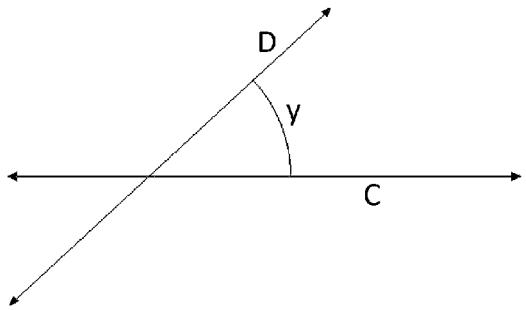
FIG. 6              FIG. 7

TOP ANGLED OFFSET MULTI-MEDIA AND USER INTERFACE

CROSS-REFERENCE TO RELATED APPLICATIONS

Not Applicable.

BACKGROUND OF THE INVENTION (1) Field of the Invention

The field of the invention is desktop computer enclosures.

(2) Description of Related Art Including Information Disclosed Under 37 CFR 1.97 and 1.98

The central processing unit (CPU) of a typical desktop computer is enclosed in a boxy enclosure. Such enclosure is known as a computer enclosure. A typical enclosure has a user interface located on the front of the enclosure (see FIG. 3). When the enclosure is placed on the floor under a workstation, however, user-access to the interface becomes rather awkward and difficult, because the interface is now located near the foot of the user (see FIG. 2).

There is a continuing need for new ways to facilitate user-accessibility of user interface on a computer enclosure.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The invention may seek to satisfy one or more of the above-mentioned desires. Although the present invention may obviate one or more of the above-mentioned desires, it should be understood that some aspects of the invention might not necessarily obviate them.

BRIEF SUMMARY OF THE INVENTION

Among the many different possibilities contemplated, a computer enclosure for a personal computer system has a top surface having a plane A; a first and a second side surfaces, both of which are coupled to the top surface; a front surface having a plane B, wherein the front surface is coupled to the first and said second side surfaces, and wherein plane A is substantially perpendicular to plane B; and a bottom surface is coupled to said front surface, and wherein the bottom surface has a plane C. The enclosure further includes an angled offset surface having a plane D, and the angled offset surface is disposed at location between and directly adjacent the top surface and the front surface.

In further contemplated embodiments, plane D offsets plane A by at least 20 degrees, and wherein plane D offsets plane B by, at most, 80 degrees.

Further, it is contemplated that the enclosure has a user interface disposed on said angled offset surface, said user interface includes at least one receiving body selected from the group consisting of a USB port and an audio port.

In preferred embodiments, the at least one receiving body has a receiving channel, and wherein the receiving channel has a longitudinal axis parallel to the direction of inserting a corresponding body into said receiving channel. Preferably, the longitudinal axis is positioned at between 20-70 degrees to said plane C; more preferably, between 30-60 degrees; and most preferably, between 40-50 degrees.

In further preferred embodiments of the inventive subject matter, the computer enclosure can further include a multi-media card slot disposed on said angled offset surface, an indicator light disposed on said angled offset surface, and at least one button disposed on said top surface within 10 cm from said angled offset surface, said at least one button is a power on/off button.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

The drawings are in simplified form and are not to precise scale. In reference to the disclosure herein, for purposes of convenience and clarity only, directional terms, such as, top, bottom, left, right, up, down, over, above, below, beneath, rear, front, distal, and proximal are used with respect to the accompanying drawings. Such directional terms should not be construed to limit the scope of the invention in any manner.

FIG. 5A is a diagram of the contemplated relationships between various planes of one embodiment of the present inventive subject matter.

FIG. 5B is a diagram of the contemplated relationships between various planes of the embodiment as shown in FIG. 1.

FIG. 6 is an illustration of the contemplated angular relationship between a plane A of the top side of the enclosure and a plane D of the interface.

FIG. 7 is an illustration of the contemplated angular relationship between a plane C of the bottom side of the enclosure and a plane D of the interface.

DETAILED DESCRIPTION OF THE INVENTION

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

Figure 1:
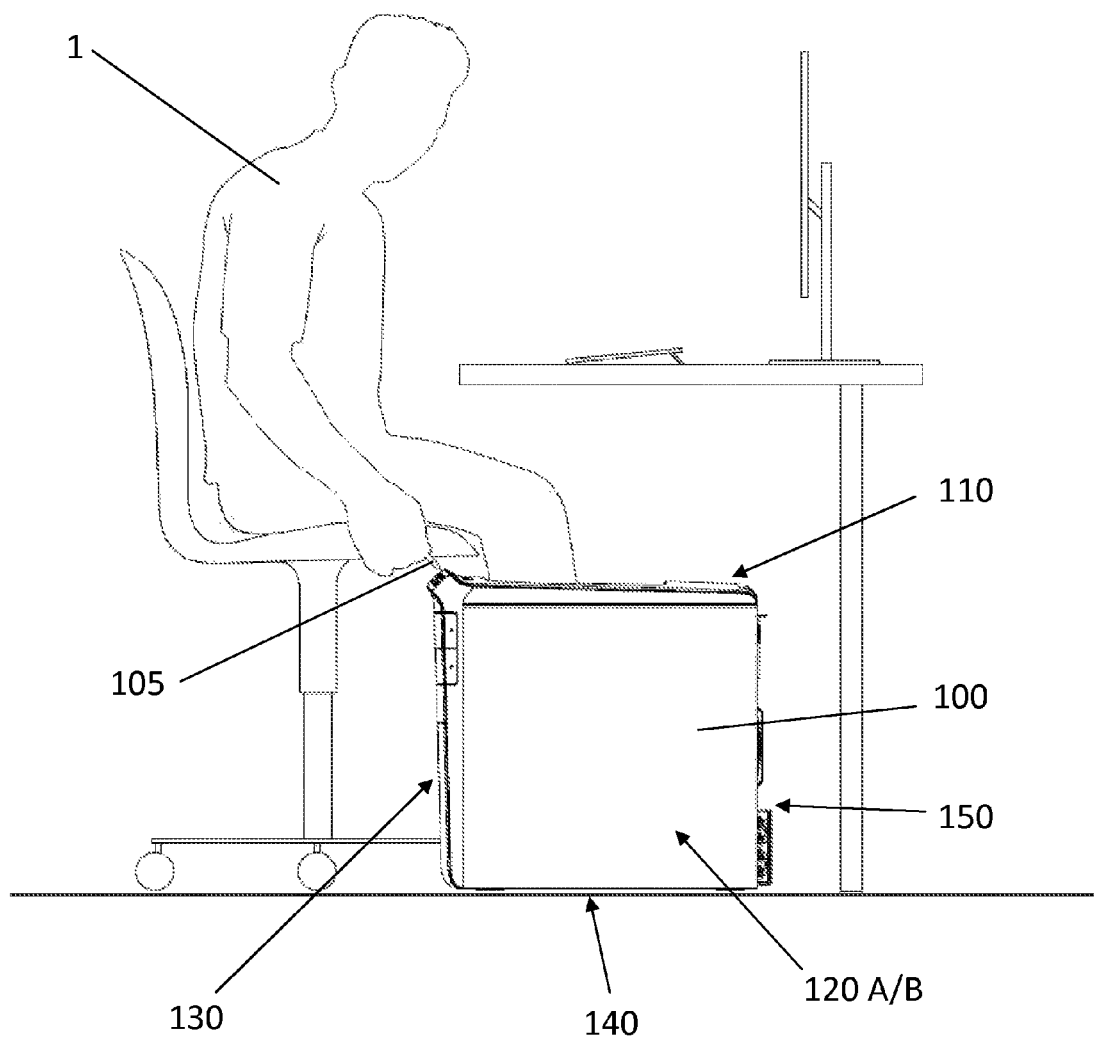
FIG. 1 is an illustration of a first embodiment of an enclosure where a user is inserting a USB storage drive into the USB port located on the interface of the contemplated computer enclosure.

Referring now FIG. 1, a contemplated computer enclosure 100 for holding the motherboard of a personal computer system is shown. The enclosure 100 has a top surface 110, and the top surface 110 has a plane A (see FIG. 5A). The computer enclosure 100 also has a first and a second side surfaces 120A and 120B (referring to FIG. 1, the opposite side of 120A is the identical side surface 120B). Both side surfaces 120A and 120B are coupled to the top surface 110. There are many known ways to connect or manufacture these sides in an enclosure design, such known method are specifically incorporated in this disclosure and can be implemented in the contemplated embodiments disclosed herein.

The contemplated computer enclosure 100 also has a front surface 130 having a plane B (see FIG. 5A). The front surface 130 is coupled to the first and said second side surfaces 120A and 120B. In one contemplated embodiment, plane A is substantially perpendicular to plane B as shown in FIGS. 5A and 5B.

The contemplated computer enclosure 100 has a bottom surface 140 coupled to said front surface 130. The bottom surface 140 has a plane C. In one contemplated embodiment, plane C is substantially perpendicular to plane B as shown in FIGS. 5A and 5B.

Figure 4:
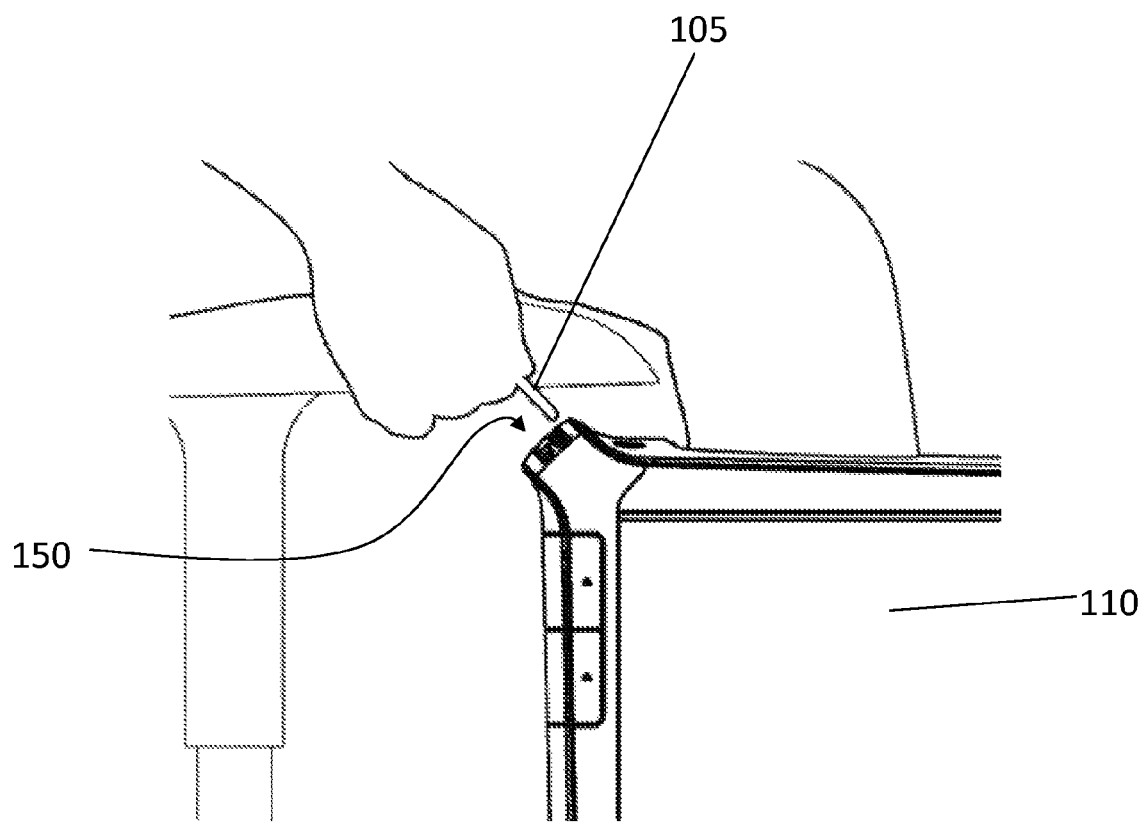
FIG. 4 is a close-up view of the embodiment as shown in FIG. 1.

Referring now to FIG. 4, in a preferred embodiment, the computer enclosure 100 has an angled offset surface 150. The angled offset surface 150 has a plane D (see FIGS. 5A and 5B), and the angled offset surface 150 is disposed at or near the edge between the top surface 110 and the front surface 130.

In one embodiment, the angled offset surface 150 is the edge formed between and by the top surface 110 and the front surface 130.

In yet another embodiment, the angled offset surface 150 is an extended edge formed between the top surface 110 and the front surface 130, where the top surface 110 extends and protrudes upward and outward to meet the front surface 130 which also extends upward and outward. The resulting extended edge is a lip that extends in a diagonally direction from the upper front corner of the enclosure. The outward extension also desirably creates an inner space to contain necessary wirings and electrical components for the connectors, readers, and switches on the interface.

Again, the most preferred embodiment has an angled offset surface 150 that is extended in an diagonally outward direction beyond where the original edge formed by the top surface and front surface would have been. As shown in FIGS. 1 and 4, the angled offset surface 150 is extended by a protruding body, and the offset surface 150 is positioned on the distal end of the protruding body.

In other preferred embodiments, such as one shown in FIG. 5A, the angled offset surface 150 is not extended in an outward direction beyond where the original edge formed by the top surface and front surface would have been. Instead, as shown in FIG. 5A, the angled offset surface 150 is essentially formed by dissecting the edge formed by the top surface and front surface.

As those of ordinary skill in the art will recognize, the offset surface 150 is relatively positioned in an angle, and all ports and connectors on the offset surface are also positioned facing frontward and upward in an angle. Because of such angled position, one skilled in the art would also immediately recognize that the angled ports and connectors on the offset surface are prone to collect dust. Such undesirable property is not seen in the prior design of having ports and connectors positioned on the front side of the enclosure. One skilled in the art would generally stay away from a design that would be prone to collect dust on the ports and connectors.

Figure 2:
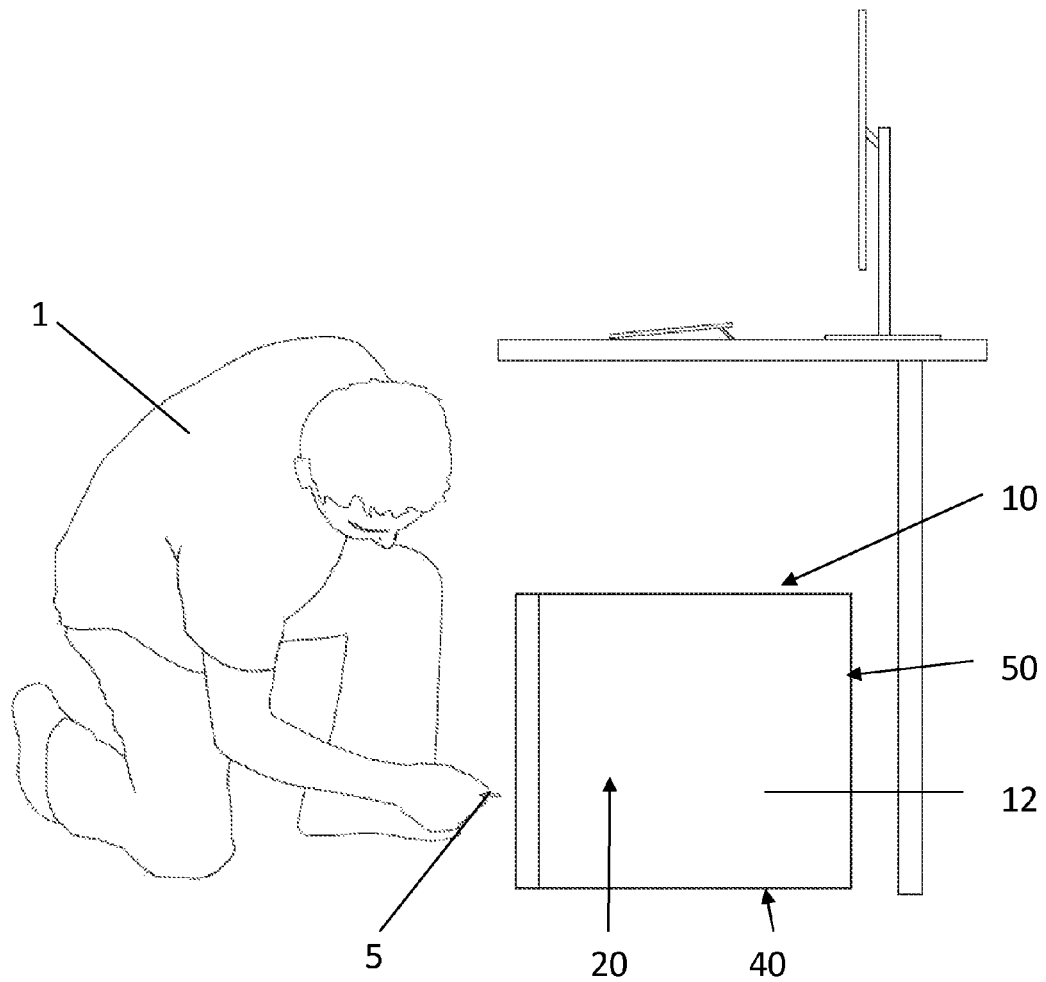
FIG. 2 is an illustration of a prior art enclosure where a user has to kneel down to insert a USB storage drive into the USB port located on the front side of the prior art computer enclosure.
Figure 3:
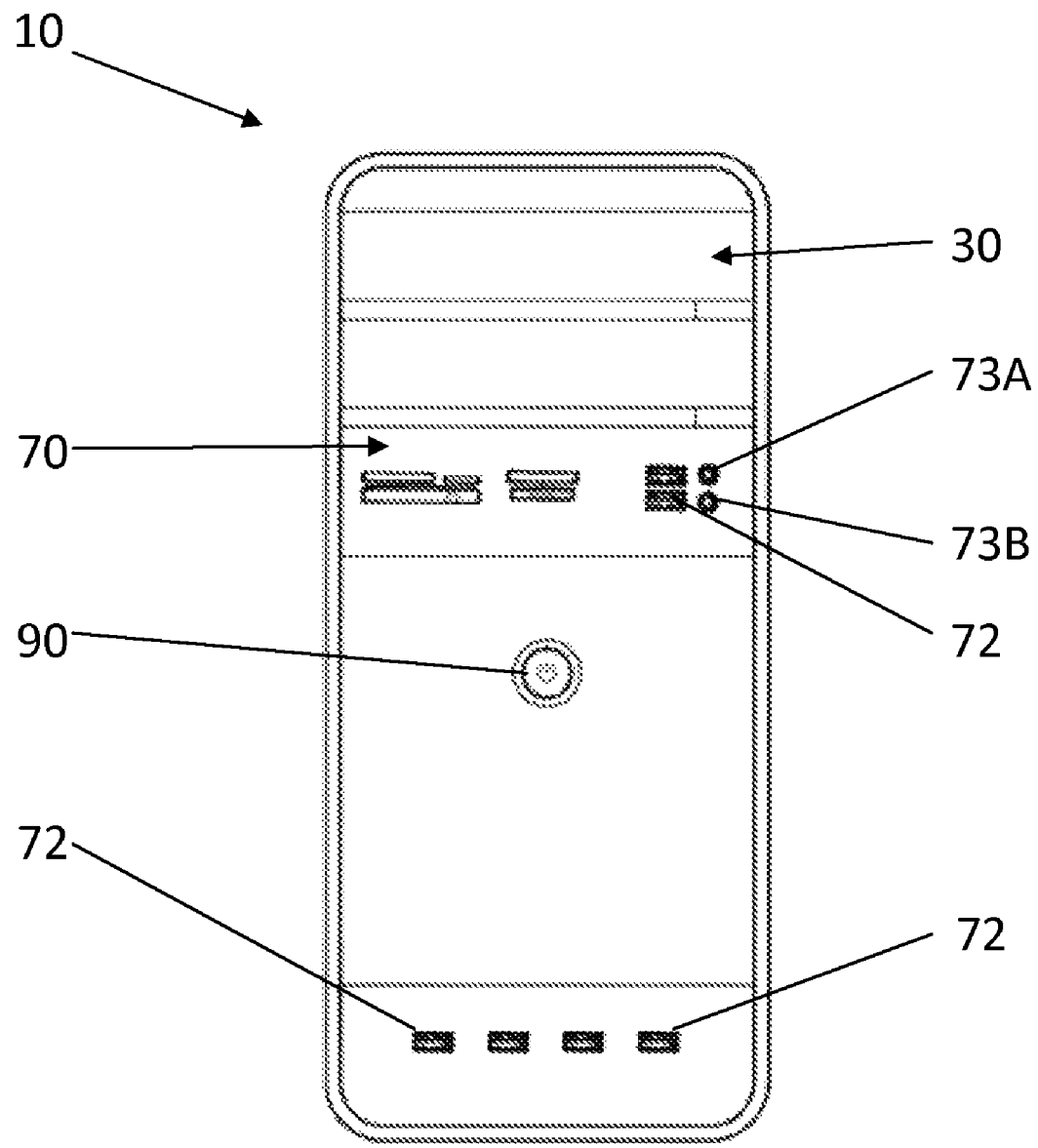
FIG. 3 is a frontal view of the prior art enclosure, showing the location of the interface region.

FIGS. 2 and 3 disclose a prior art enclosure 10, having a front side 30, a top side 10, a back side 50, a bottom side 40, and an user interface area 70 having USB port 72, audio ports 73A and 73B, and various other card reader slots. A power on/off button 90 is located in the middle, and four additional USB ports 72 are provided at the bottom of the front side 30.

As will be described below, those of ordinary skill in the art will also recognize the disadvantages in manufacturing cost, part replacement, and space allocation presented by the preferred embodiments of angled offset interface 150.

Prior art enclosure boxes typically has interface that are dictated by its spatial relationship with the motherboard. Interfaces are almost ways built on the enclosure at a location that is near the corresponding locations of the corresponding connectors on the motherboard. This way, when a motherboard is installed, the interface is in immediate close proximity to the corresponding connectors on the motherboard. Alternatively, in some prior art designs, interface is already installed on the motherboard. When the appropriate enclosure is used, the enclosure exposes the interface installed on the motherboard, making assembling and manufacturing even more efficient. Prior art designs ease installation procedure, and decrease manufacturing cost. As a result, prior art user interface is typically on the front or on the back side of the enclosure.

Prior art design also facilitates consumers to buy replacement enclosure and reinstall enclosure on their own. For example, a computer parts store can easily match a consumer's motherboard with the appropriate enclosure. A consumer can easily install the motherboard in a prior art enclosure, and exposing the interface on the motherboard. Such installation is relatively easy. One skilled in the art would readily appreciate the business and marketing advantages in the prior art by providing consumers with computers where its parts can be easily disassembled and assembled/replaced by the consumer.

Those of ordinary skill in the art will also recognize that by having the interface in an upper front corner, away from the corresponding locations of these connectors on the motherboard, manufacturing cost would undesirably increase due to the need to route electrical wires to these locations. This would reasonably translate into increased assembling steps, labor costs, and parts costs.

As one skilled in the art would immediately recognize, the complex can take up valuable inner space of the enclosure. Prior art enclosure design and interface design has the advantage of saving space. One preferred embodiment, as shown by FIGS. 1 and 4, has an extended protruding housing that allows an added space in the protrusion to housing the complex. Also, the extended "lip" structure focuses a user to the interface.

As used herein, the term "user interface 170" refers to the abstract idea of having a tangible communication point between the enclosure 110 and the user 1. And the term "angled offset surface 150" refers to the physical surface that contains the ports and connectors. For example, in one contemplated embodiment, the enclosure 110 has user interface 170 located at the upper front corner of the enclosure 110, and the angled offset surface 150 can be a flat plate as shown in FIG. 4, and can be a typical corner having ports, slots, and buttons installed at an angle.

While one way to define and describe the user interface 170 is by describing its relative position to the angled offset surface 150, in some preferred embodiments, the user interface may or may not be disposed on an easily distinguishable flat surface plate 150. For example, contemplated embodiments can have all the desired ports, connectors, and indicator lights at an upward and frontward angle, but on a rounded interface surface instead of a flat interface surface.

The user interface 170 can also be described by its relative position with a complex that contains all of the desired inner electrical components that is required for the user interface. Such interface complex is coupled to the housing and is disposed near a region intersected by said top surface and said front surface. This complex is defined by collection of parts necessary to enable the user interface. This collection of parts is assembled and positioned directly behind the interface surface. Further, this user interface complex has a front and a frontal facing direction. This front does not parallel with plane B, and the frontal facing direction does not parallel with plane C.

Contemplated interface complex contains a USB port, an audio port, and a multi-media card slot, necessary electrical wires, and necessary hardness to keep these electrical components together.

Each of these electrical components is contained within the complex, and each has a user-access point exposed to the outside of the enclosure 110. This complex may or may not have its own housing. In one embodiment, this complex is simply a collection of wires and necessary electrical components installed directly behind the interface surface to enable the interface. In preferred embodiments, the user-access points of the USB port, the audio port, and the multi-media card slot are disposed on the front of the interface complex.

In some embodiments, the frontal facing direction of the complex is at an angle of between 20-70 degrees relative to said plane B.

Figure 8:
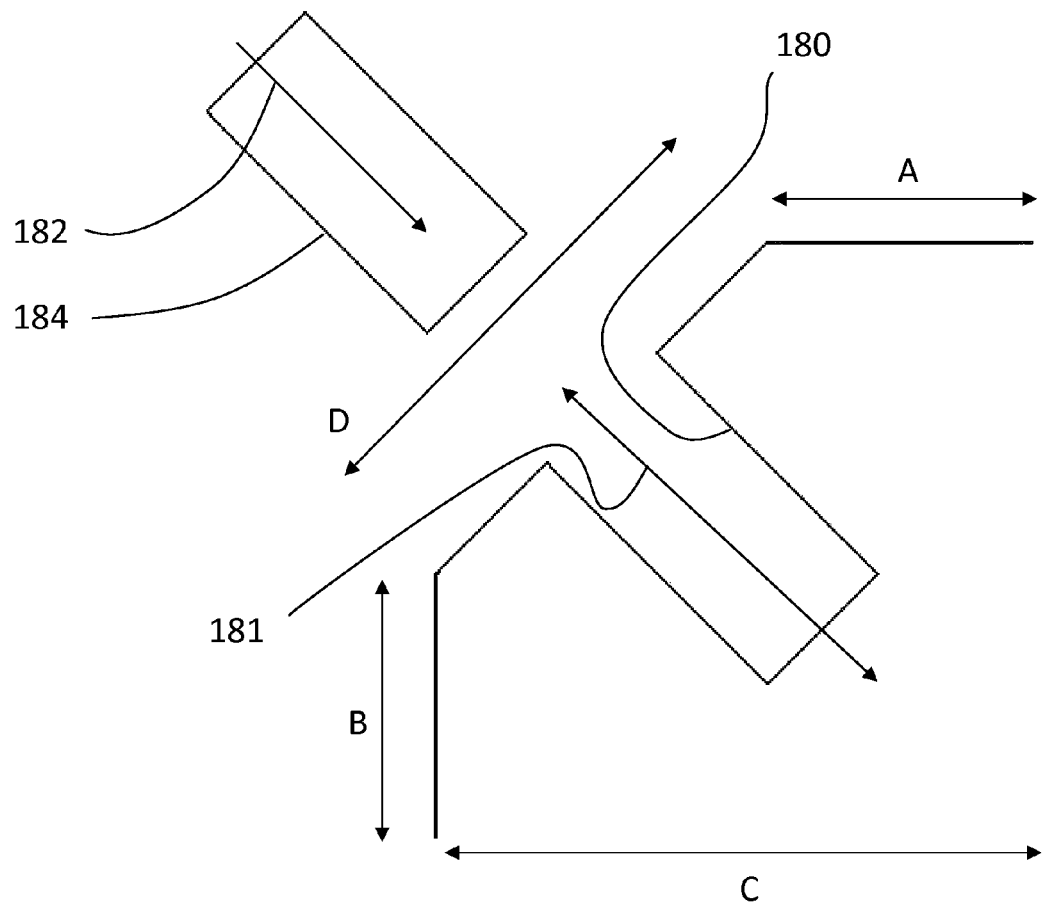
FIG. 8 is an illustration of the relationship between a receiving channel located in the interface and an inserting body, such as a USB storage drive.
Figure 9:
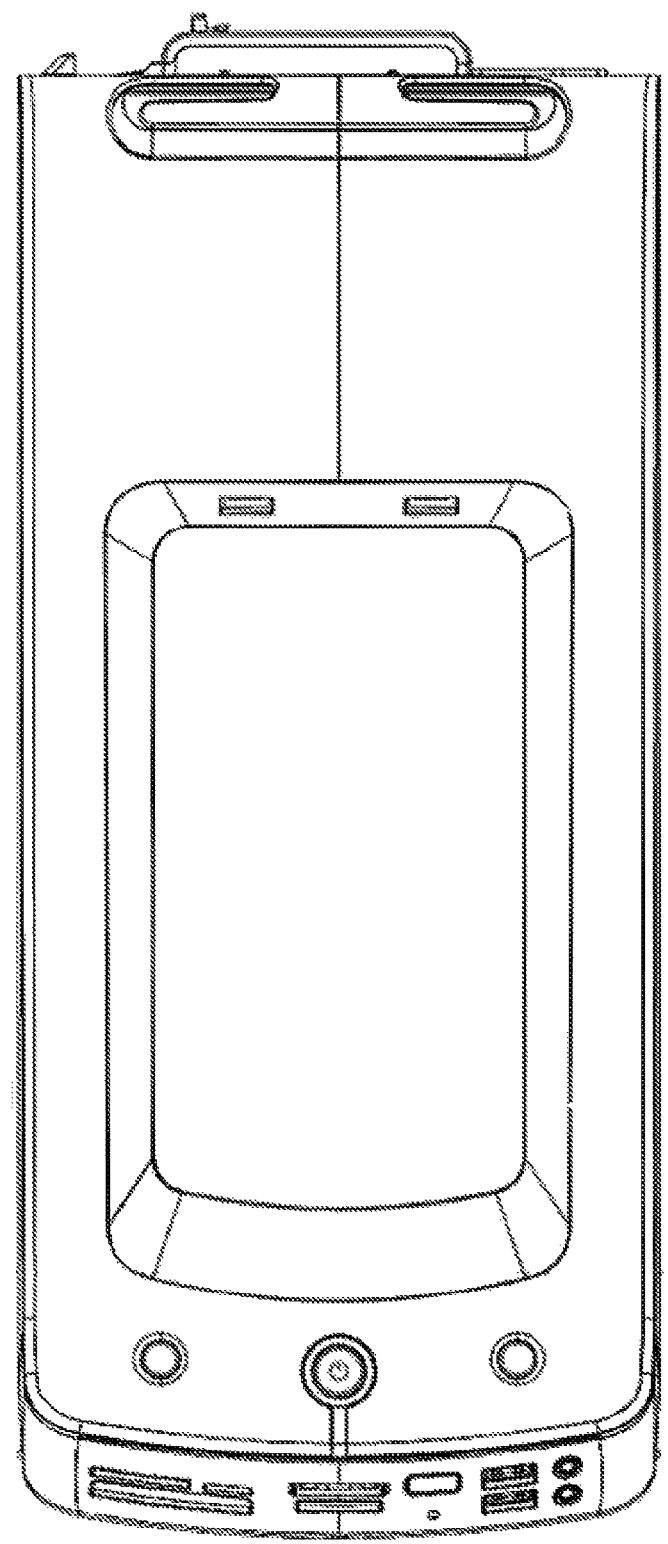
FIG. 9 is a top view of the embodiment as shown in FIG. 1.

In other preferred embodiments, the frontal facing direction of the complex is at an angle of between 30-70 degrees relative to said plane B, and additionally or optionally, the frontal facing direction parallels with a longitudinal direction 181 of a receiving channel of at least one of the USB port, the audio port, and the multi-media card slot (see FIG. 8).

In some embodiments, the frontal facing direction of the complex is at an angle of between 35-70 degrees relative to said plane B.

In some embodiments, the frontal facing direction of the complex is at an angle of between 40-70 degrees relative to said plane B.

In some embodiments, the frontal facing direction of the complex is at an angle of between 40-60 degrees relative to said plane B.

Again, as illustrated in FIGS. 1 and 4, the complex can protrude from and out of the generally rectangular space of the enclosure 110. This protrusion extends a faceplate 150 of the complex in the frontal facing direction. In the preferred embodiment, the protrusion protrudes out of a corner intersected by the top surface and the front surface. As for the frontal facing direction, it is generally defined as the direction that is perpendicular to the plane of the faceplate 150.

It should be noted that, in some embodiments, the longitudinal axis 181 does not necessary parallel with the frontal facing direction.

Whichever way the angled offset surface 150 is formed or supported, whether or not with a protruding body, the purpose is the present an angled offset surface 150 to contain user interface and its related connectors and buttons at an angle that is has an improved user-accessibility.

Figure 10:
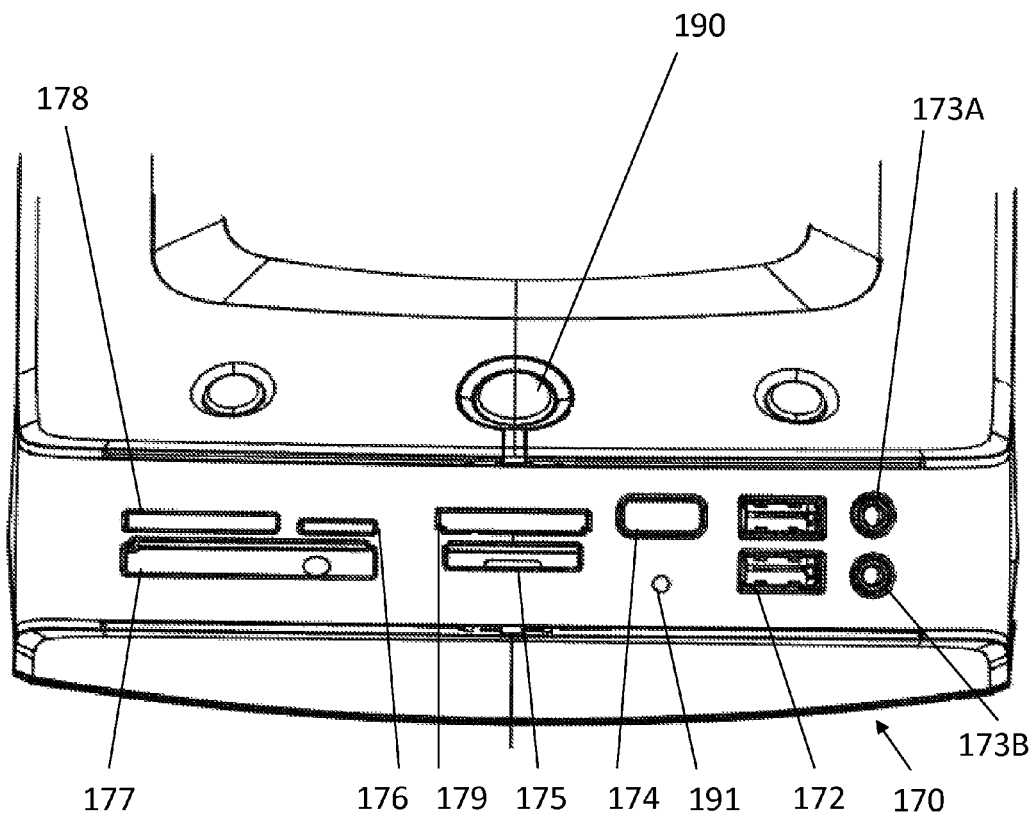
FIG. 10 is a direct frontal view of the interface of the embodiment as shown in FIG. 1, such that the top side and the front side of the enclosure are being shown at an angle.

Comparing FIG. 1 to FIG. 2, the presently disclosed embodiments provide a user 1 an ergonomic alternative to having to kneel down to access user interface of the prior art enclosure 12. This is particularly important because some of the functions on the user interface require a user to clearly see what's on the user interface. For example, inserting a USB storage drive 105 into a USB port 172 requires a user 1 to insert the USB drive 105 with the correct side facing up, corresponding to the USB port 172. This cannot be done unless a user 1 can look into the USB port 172 to determine which side is up. As for audio ports 173A and 173B (see FIG. 10), a user 1 will need to look at the indicating drawings next to the audio ports closely to determine which of the two is for ear phone, and which is for microphone.

Contemplated user interface 170 contains at least one receiving body, which can include typical connectors, switches, and ports. The preferred embodiments can contain USB ports 172, audio ports 173A and 173B, photo frame cord connector port 174, MS/MS Pro port 175, Micro SD port 176, CF card port 177, xD card port 178, and SD/MMC card port 179.

Audio ports 173A and 173B preferably connects to at least one of an external speaker, a microphone, and an earphone. Optionally, the angled offset surface 150 can have a switch to adjust the volume of the output of the audio port, and at least one button disposed on said angled offset surface, wherein these buttons can include power on/off button, a disc drive door open/close button.

Contemplated user interface 170 can also include an indicator light 191. One skilled in the art would immediately recognize the possibilities in the function and the use of the indicator light 191.

Most of these receiving bodies have a receiving channel 180 with a longitudinal axis 181 (see FIG. 8). The longitudinal axis 181 is parallel to the direction 182 (or direction E in FIGS. 5A and 5B) of inserting a corresponding body 184 into the receiving channel 180. An example of a corresponding body is a USB storage drive 105 for insertion into USB port 172.

In some embodiments, the user interface 170 may not have a flat angled offset surface as shown in FIG. 1. In such embodiments, the same purpose can be achieved by orienting the positions of receiving bodies such that these receiving bodies face the user in an angle that greatly improves user-accessibility.

In some preferred embodiments, the longitudinal axis 181 is positioned at between 20-70 degrees to plane A.

In other preferred embodiments, the longitudinal axis 181 is positioned at between 30-60 degrees to plane A.

In yet other preferred embodiments, the longitudinal axis 181 is positioned at between 40-50 degrees to plane A.

Because the top surface of the enclosure 110 may have other shapes and may have a plane that is not substantially horizontal, another way to define these angles is to look at the relative angle between the longitudinal axis 181 to the ground, or to plane C. As used herein, plane C is the same as the leveled ground where the enclosure 110 is positioned.

In the preferred embodiments, the longitudinal axis 181 is positioned at most 80 degrees to plane C.

In some preferred embodiments, the longitudinal axis 181 is positioned at between 20-70 degrees to plane C.

In other preferred embodiments, the longitudinal axis 181 is positioned at between 30-60 degrees to plane C.

In yet other preferred embodiments, the longitudinal axis 181 is positioned at between 40-50 degrees to plane C.

In short, the inventor has discovered a preferred range of angles for the angled offset surface 150. As previously mentioned, referring to FIGS. 5A, 5B, and 6, plane D of the angled offset surface 150 preferably offsets plane A by an angle X of at least 20 degrees, and wherein plane D offsets plane B by at least 20 degrees. In yet another preferred embodiment, plane D of the angled offset surface 150 offsets plane C by an angle Y of, at most, 80 degrees, and wherein plane D offsets plane B by at least 20 degrees.

Thus, specific embodiments and applications of Top Angled-Offset Multi-Media and User Interface have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. In addition, where the specification and claims refer to at least one of something selected from the group consisting of A, B, C . . . and N, the text should be interpreted as requiring only one element from the group, not A plus N, or B plus N, etc.

What is claimed is:

1. A computer enclosure for a personal computer system, said enclosure is comprised of:
   a top surface having a plane A;
   a first and a second side surfaces, both of which are coupled to the top surface;
   a front surface having a plane B, said front surface is coupled to said first and said second side surfaces;
   a bottom surface is coupled to said front surface, and wherein the bottom surface has a plane C, wherein plane B is substantially perpendicular to plane C;
   an angled offset surface having a plane D, said angled offset surface is disposed between said top surface and said front surface, wherein plane D offsets plane B by, at most, 80 degrees; and
   a user interface disposed on said angled offset surface, said user interface includes at least one receiving body selected from the group consisting of a USB port and an audio port.

2. The computer enclosure as recited in claim 1, wherein the at least one receiving body has a receiving channel, and wherein said receiving channel has a longitudinal axis parallel to the direction of inserting a corresponding body into said receiving channel, and wherein the longitudinal axis is positioned at between 20-70 degrees to said plane C.

3. The computer enclosure as recited in claim 2, wherein the longitudinal axis is positioned at between 30-60 degrees to said plane C.

4. The computer enclosure as recited in claim 3, wherein the longitudinal axis is positioned at between 40-50 degrees to said plane C.

5. The computer enclosure as recited in claim 3 further including a multi-media card slot disposed on said angled offset surface.

6. The computer enclosure as recited in claim 3 further including an indicator light disposed on said angled offset surface.

7. The computer enclosure as recited in claim 3, further including at least one button disposed on said top surface within 10 cm from said angled offset surface, said at least one button is a power on/off button.

8. A computer enclosure of a computer system, said enclosure is comprised of:
   a housing to hold a motherboard, said housing having a front surface, a top surface, a back surface, a bottom surface, and two side surfaces;
   wherein said top surface has a plane A;
   wherein said front surface has a plane B,
   an angled offset interface complex coupled to the housing and is disposed near a region intersected by said top surface and said front surface, said user interface complex has a front and a frontal facing direction;
   wherein said angled offset interface complex contains a USB port, an audio port, and a multi-media card slot;
   wherein a plurality of user-access points of said USB port, said audio port, and said multi-media card slot are disposed on said front of said interface complex;
   wherein said frontal facing direction is at an angle of between 20-70 degrees relative to said plane B.

9. The computer enclosure as recited in claim 8, wherein said frontal facing direction is at an angle of between 30 to 70 degrees relative to said plane B, and said frontal facing direction parallels with a longitudinal direction of a receiving channel of at least one of the USB port, the audio port, and the multi-media card slot.

10. The computer enclosure as recited in claim 9, wherein said frontal facing direction is at an angle of between 40-70 degrees relative to said plane B.

11. The computer enclosure as recited in claim 10, wherein said frontal facing direction is at an angle of between 40-60 degrees relative to said plane B.

12. The computer enclosure as recited in claim 11, wherein said complex has a protrusion that extends a faceplate of the complex in said frontal facing direction, and said protrusion protrudes out of a corner intersected by said top surface and said front surface.

13. The computer enclosure as recited in claim 12, wherein the said complex further comprises an indicator light.

14. The computer enclosure as recited in claim 12, wherein the said complex further comprises a power on/off switch.

15. The computer enclosure as recited in claim 12, wherein the said audio port connects at least one of an external speaker, a microphone, and an earphone.

16. The computer enclosure as recited in claim 12, wherein the said complex further comprises an indicator light.

* * * * *